April 7, 1936.  A. B. SCOTT ET AL  2,036,505
WINE PRESERVING APPARATUS
Filed Jan. 2, 1935
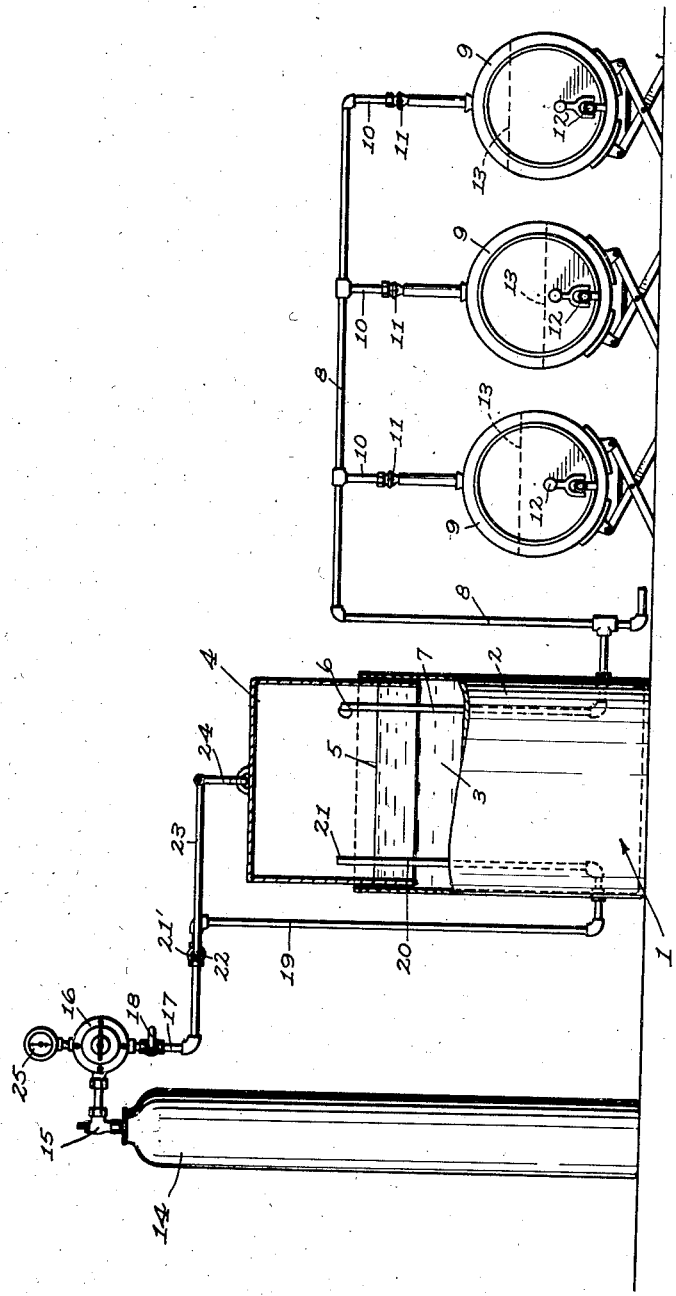
Inventors
Albert B. Scott
Garnett R. Robertson
By Lyon & Lyon
Attorneys Patented Apr. 7, 1936

2,036,505

UNITED STATES PATENT OFFICE 2,036,505

WINE PRESERVING APPARATUS

Albert B. Scott, Los Angeles, and Garnett R. Robertson, Manhattan Beach, Calif.; said Robertson assignor to said Scott Application January 2, 1935, Serial No. 112

2 Claims. (Cl. 225—17)

This invention relates to apparatus for preserving a liquid such as wine, from deterioration or from fermentation. The apparatus enables quantities of liquid to be kept in containers from which the liquid is drawn from time to time, without enabling the liquid in the container to come in contact with the atmosphere.

The general object of the invention is to provide simple apparatus for accomplishing the purposes indicated above, and for enabling a liquid such as wine, to be kept in casks without fermentation or souring effects which might occur if the surface of the wine were exposed to the atmosphere, or in contact with the oxygen of air.

We are aware that preservative gases such as carbon dioxide gas, have been employed as an inert medium to exclude air or atmosphere from contact with substances or foods, which might ferment or sour, from contact with oxygen. Our invention is intended particularly to provide simple apparatus which will enable a liquid such as wine in casks, to be maintained out of contact with air, and at the same time, enable the wine to be drawn off from time to time from the casks without interfering with the maintenance of the preserving gas in the casks above the liquid.

One of the objects of the invention is to provide a system of apparatus for this purpose, which will maintain a slight pressure on gas that is in the casks, so that if any leakages in the system occur, such a leak would be a leakage of gas from the system rather than the leakage of air into the system.

In its preferred embodiment, the invention involves the use of a gas holder which is supplied with gas under a slight pressure, and this gas holder operates as a reservoir of sufficient capacity to insure that when wine is drawn off from the casks, there will always be a sufficient quantity of gas to flow into the casks from the gas holder or reservoir, to insure that the wine will flow freely from the casks; and one of the objects of the invention is to provide the apparatus with simple means for insuring that gas will be supplied to the gas holder at all times, in quantities sufficient to maintain gas in the gas holder even if the same is being drained rapidly by reason of the drawing off of wine from many, or all, of the casks at the same time.

Further objects of the invention will appear hereinafter.

The invention consists in the novel parts and combination of parts to be described hereinafter, all of which contribute to produce an efficient wine preserving apparatus.

A preferred embodiment of the invention is described in the following specification, while the broad scope of the invention is pointed out in the appended claims.

In the drawing:

The figure is a diagrammatic view illustrating the apparatus of our invention, and in this view the gas holder is broken away above, so as to show it partially in vertical section.

In practicing the invention, we provide a gas holder 1, which includes a base 2 which operates as a container for a water bath 3. This water bath provides a seal for a movable member in the form of a bell 4, or inverted cylinder, the lower edge of which rests in the water seal 3, and this bell 4 telescopes within the base 2. At a point above the level 5 of the liquid, we provide an outlet 6 which, in the present instance, is the open upper end of the pipe 7 that extends downwardly, and which passes through the side of the base 2 so as to connect with a pipe or main 8 for supplying inert gas such as carbon dioxide gas, to a plurality of containers such as wine casks 9. This main 8 is provided with individual pipe connections 10, which lead down to the casks or barrels 9, and these connections 10 are provided with valves or cocks 11 for enabling the gas supply to pass down into the connections. The barrels are provided with taps or faucets 12, for drawing off the wine as required. With this arrangement the space in all the casks above their wine levels 13, will be filled with the preserving gas such as carbon dioxide.

A suitable gas supply is provided for supplying the gas to the holder 1. For this purpose we prefer to employ a gas "bottle" 14. These bottles are usually provided with a valve 15 which, when opened, permits the gas to flow at reduced pressure into a receiver 16, which may also include a reducing valve or regulator that supplies the gas to an outlet pipe 17, which may include a valve or cock 18 which, when opened, permits the gas to flow through a down pipe 19 which connects to an inlet pipe 20, the delivery mouth 21 of which is located above the level 5 of the water bath in the gas holder. The pipe connections include a valve or cock 21', the amount of opening through which is regulated automatically through the bell 4. For this purpose the valve or cock 21' has a rotatable plug 22 movable with equal freedom in either direction, provided with a lever 23, and this lever is connected by a link 24 to a point on the bell 4.

An indicating gauge 25 may be provided for indicating the pressure in the regulator 16.

When the apparatus is in operation, the valves 15 and 18 are open so as to permit regulated flow of gas from the gas bottle 14 through the automatic valve 21 and the pipe 20 into the interior of the gas holder. If wine is being drained off from the casks at a rapid rate, the bell 4 will descend, and this will operate through the link 24 and the lever 23 to open the valve 21, permitting an increased quantity of gas to flow into the gas holder. In practice, the main 8 may be of considerable length so as to supply a great number of casks. Whenever a cask is to be disconnected, the valve or cock 11 that connects this cask to the pipe system, would be closed.

While we have represented pipe 8 as being overhead, if more convenient, the pipe mains and their branches could be run along the floor or strung along on a side wall.

What we claim is:

1. In apparatus for preserving liquid, the combination of a container for the liquid, an expansible gas-holder for holding a quantity of preservative gas and having an outlet for the gas, a connection from the gas-holder leading to the said container, a source of supply for the gas, a connection from the source of supply to the gas-holder for supplying gas to the same and including an unresisting valve movable with equal freedom toward its open or closed position, and automatic means for moving the said valve positively in either direction to partially open the valve, and thereby increase the supply of gas to the gas-holder when the quantity of gas within the same becomes reduced, and to close the valve when the gas-holder is expanded to its maximum expansion, said gas-holder operating to maintain gas pressure on the wine substantially equal to that existing in the gas-holder.

2. In apparatus for preserving wine held in separate casks, the combination of a plurality of casks for wine, an expansible gas-holder for holding a quantity of carbon dioxide gas and having an outlet for the gas, with individual connections for conducting gas from the gas-holder to the different casks, a source of supply for the carbon dioxide gas connected with the gas-holder including a reducing valve, said gas-holder having a liquid sealing bath and having a bell with its lower edge sealed in the bath and capable of rising and falling with the variation in the quantity of gas in the holder, a connection from the gas supply including a valve freely movable in its closing or opening direction; and means connected with the said bell for positively moving the valve to more or less open positions to admit gas to the gas-holder when the bell has descended to the lower limits of its movement, said bell operating to maintain gas pressure on the wine determined by the weight of said bell.

ALBERT B. SCOTT.
GARNETT R. ROBERTSON.